(No Model.) 5 Sheets—Sheet 1.
F. B. GIESLER.
MALTING APPARATUS.
No. 507,613. Patented Oct. 31, 1893.
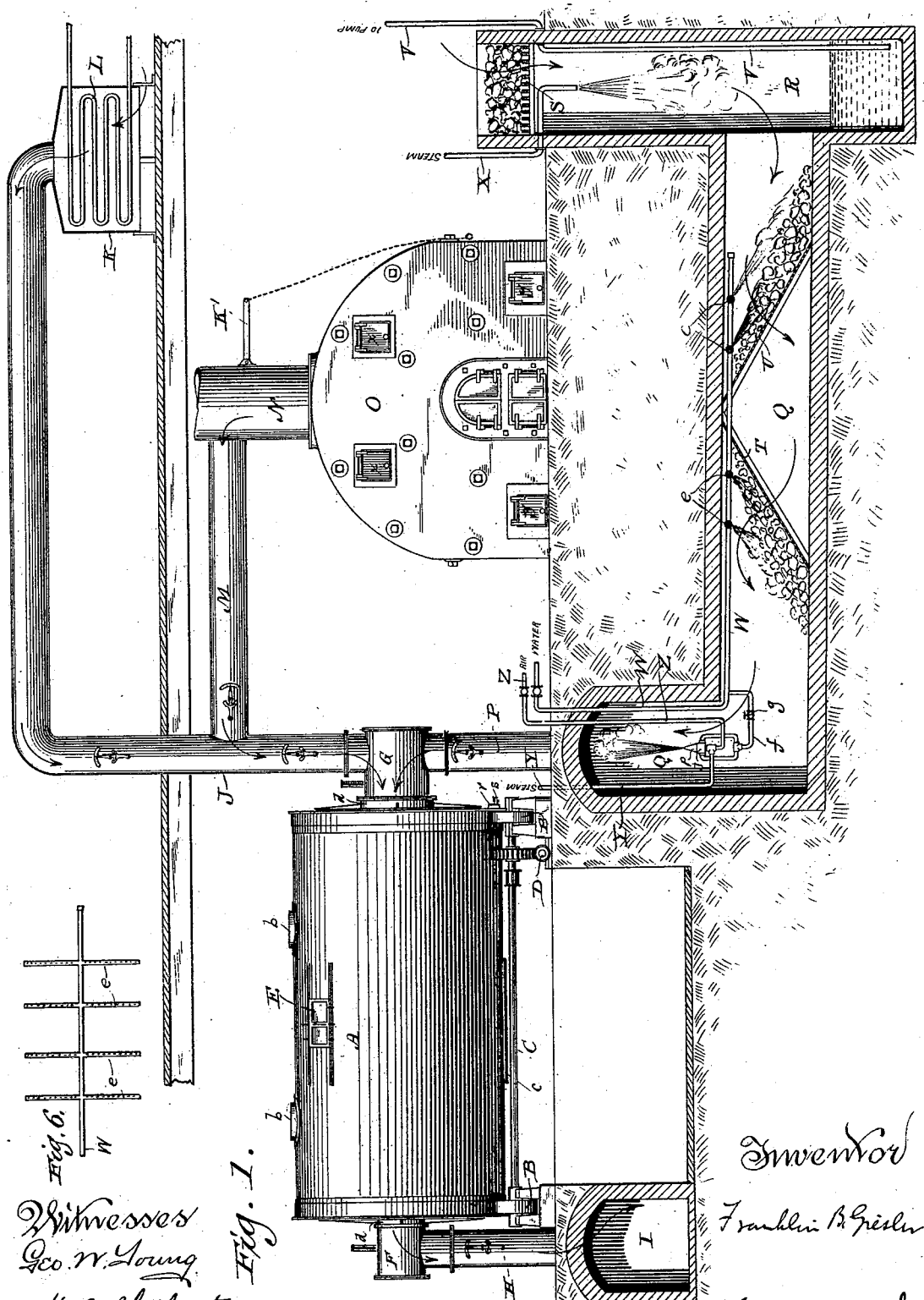
Witnesses
Geo. W. Young
N. E. Oliphant
Inventor
Franklin B. Giesler
By H. G. Underwood
Attorneys

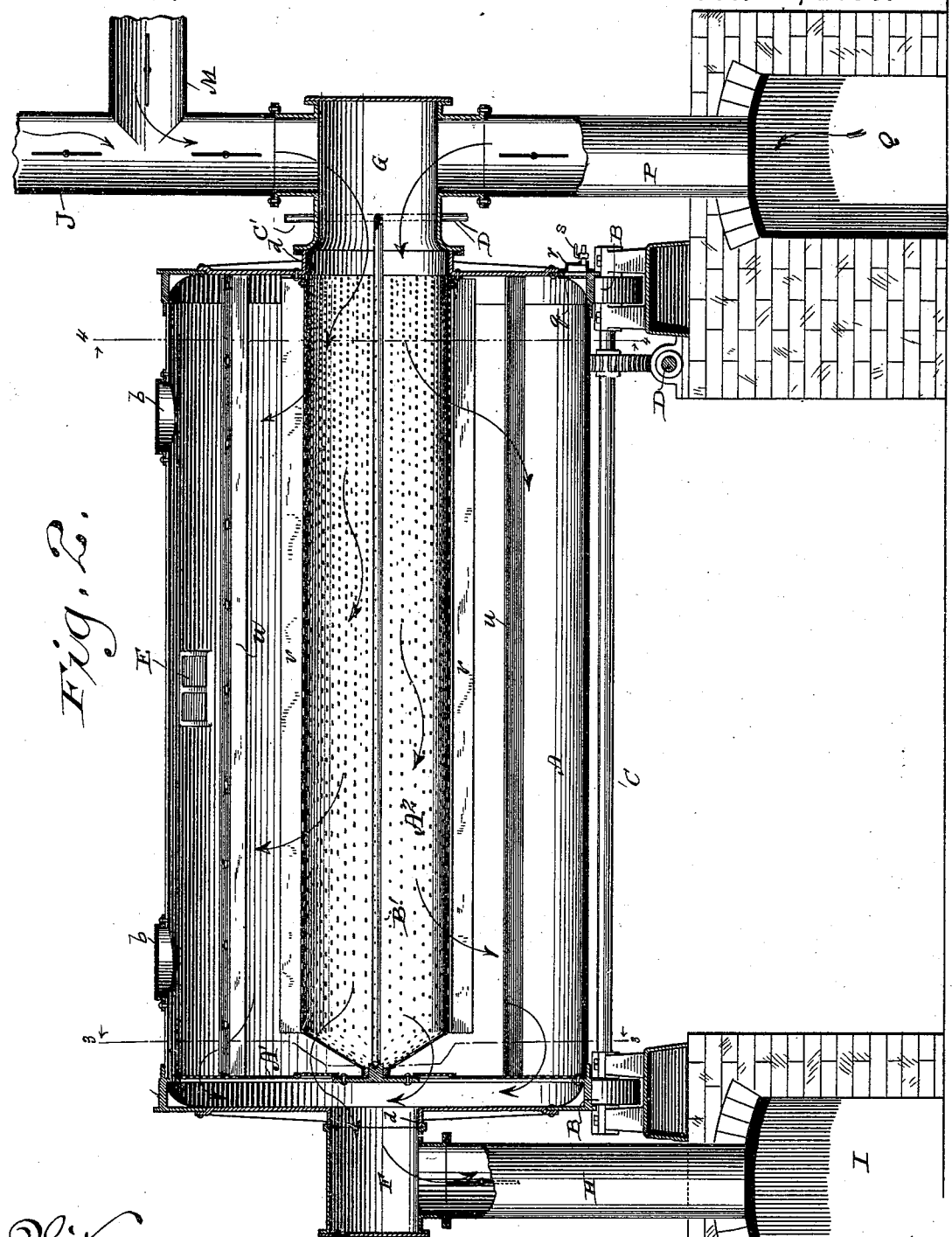

(No Model.) 5 Sheets—Sheet 3.

F. B. GIESLER.
MALTING APPARATUS.

No. 507,613. Patented Oct. 31, 1893.

Witnesses
Geo. W. Young.
W. E. Oliphant

Inventor
Franklin B. Giesler
By H. G. Underwood
Attorney (No Model.) 5 Sheets—Sheet 4.

F. B. GIESLER.
MALTING APPARATUS.

No. 507,613. Patented Oct. 31, 1893.

Witnesses
Geo. W. Lowry
N. E. Oliphant

Inventor
Franklin B. Giesler
By H. G. Underwood
Attorney

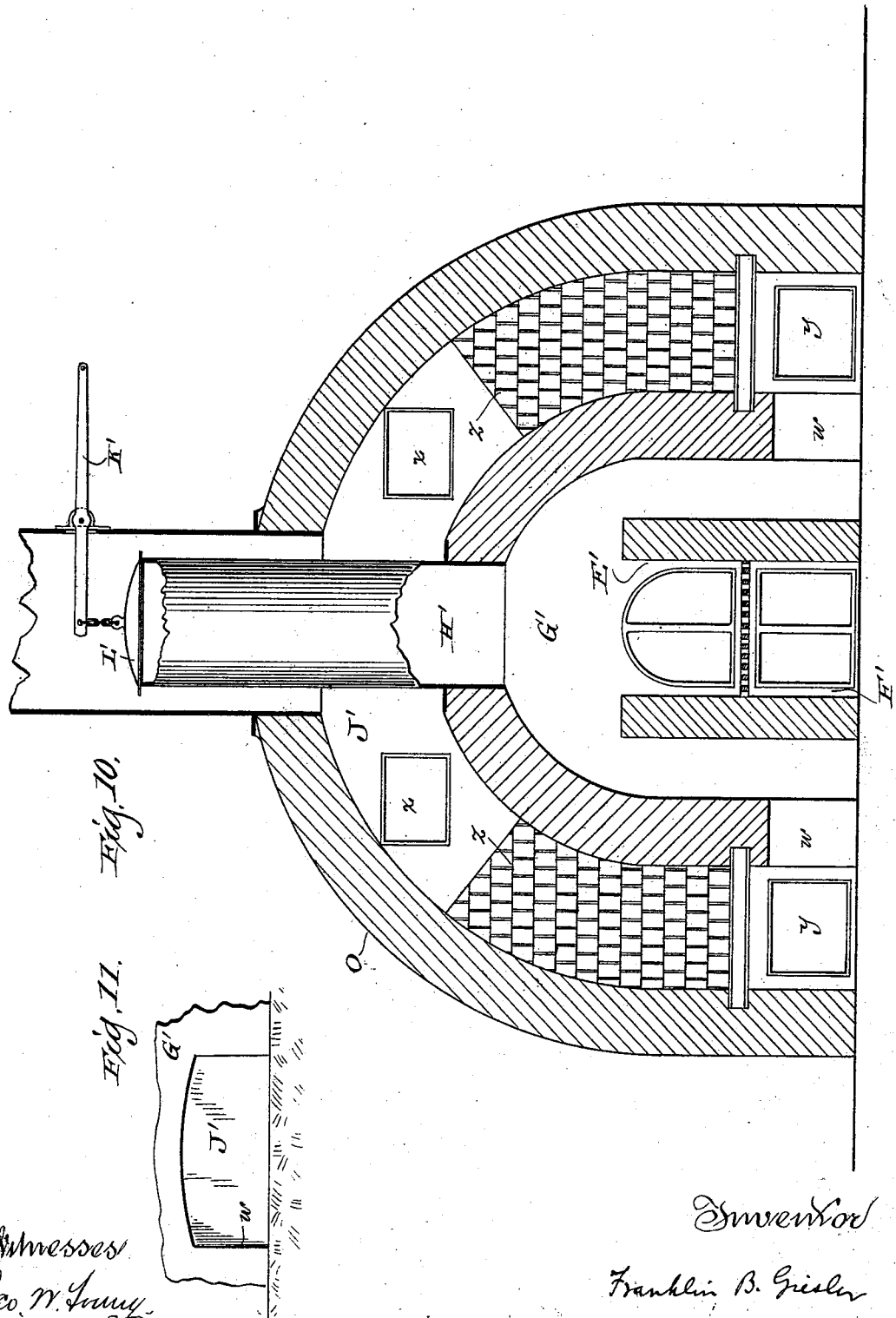

UNITED STATES PATENT OFFICE.

FRANKLIN B. GIESLER, OF MILWAUKEE, WISCONSIN.

MALTING APPARATUS.

SPECIFICATION forming part of Letters Patent No. 507,613, dated October 31, 1893.

Application filed March 6, 1893. Serial No. 464,831. (No model.)

*To all whom it may concern:*

Be it known that I, FRANKLIN B. GIESLER, a citizen of the United States, and a resident of Milwaukee, in the county of Milwaukee, and in the State of Wisconsin, have invented certain new and useful Improvements in Malting Apparatus; and I do hereby declare that the following is a full, clear, and exact description thereof.

My invention has for its object to simplify and cheapen the production of malt, as well as to improve the quality of the same; and it consists in certain peculiarities of construction and combination of parts embodied in apparatus for this purpose, all as hereinafter described with reference to the accompanying drawings and subsequently claimed.

Figure 4:
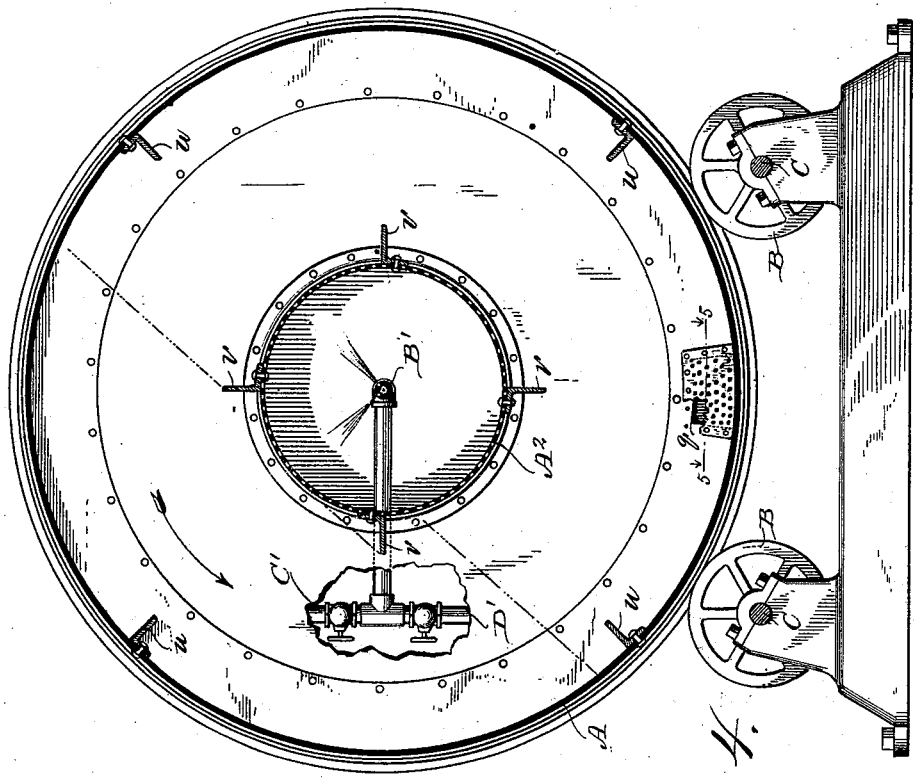
Figure 5:
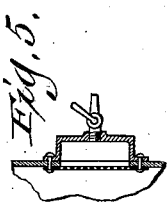
Figure 3:
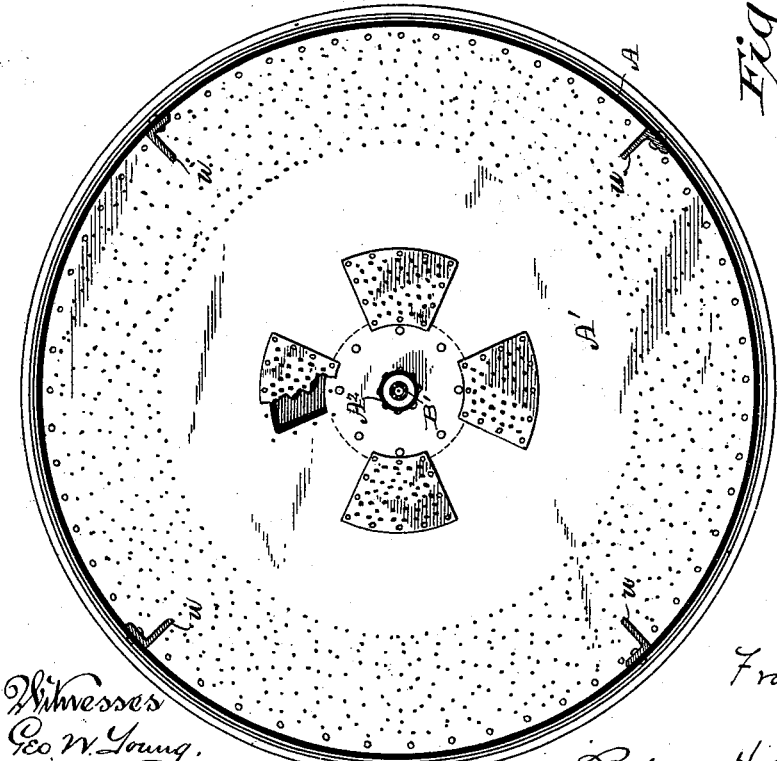
Figure 7:
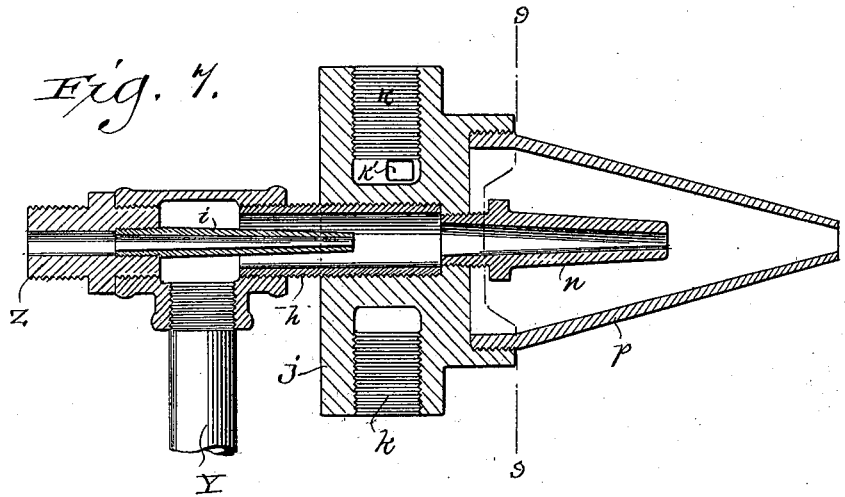
Figure 8:
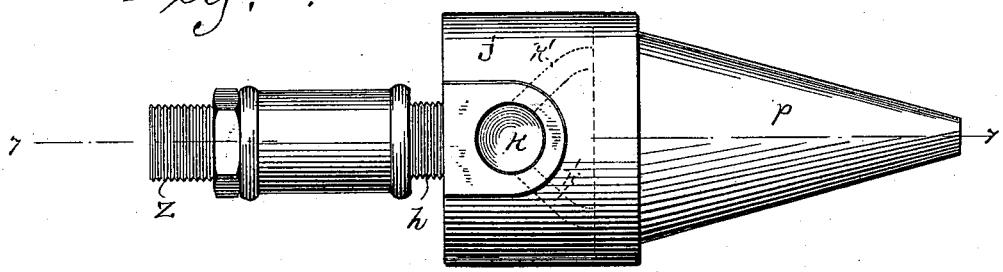
Figure 9:
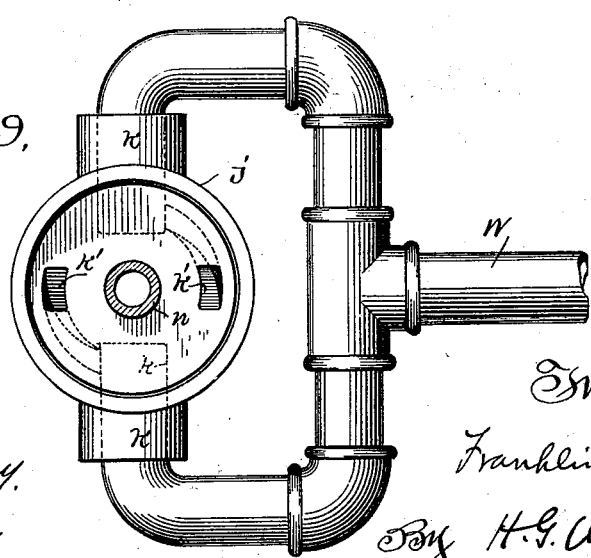

In the drawings: Figure 1 represents an elevation of my improved malting apparatus partly in section; Fig. 2, a vertical longitudinal section with parts in side elevation, illustrating a rotary drum and certain connections therewith that form portions of the malting apparatus; Figs. 3 and 4, transverse sections respectively taken on lines 3—3 and 4—4 of the preceding figure; Fig. 5, a detail section taken on line 5—5 of Fig. 4; Fig. 6, a detail plan view of a sprinkling mechanism constituting part of said apparatus; Fig. 7, a vertical transverse section of an atomizer that also forms part of the said apparatus, the section being taken on line 7—7 of the succeeding figure; Fig. 8, an elevation of the atomizer; Fig. 9, a plan view of said atomizer partly in horizontal section on line 9—9 of Fig. 7; Fig. 10, a vertical transverse section of a peculiarly constructed furnace constituting part of the aforesaid apparatus, and Fig. 11, a detail view of a portion of the furnace.

With the apparatus hereinafter specified, the washing, steeping, germinating, withering and drying operations, necessary to the conversion of grain into malt, may take place in a single drum and said apparatus will be described with reference to those operations in their successive order.

Referring by letter to the drawings, A represents a non perforate grain receiving drum having the peripheries of its heads impinged against friction disks B fast on longitudinal shafts C arranged in suitable bearings on opposite sides of the center of the drum beneath the same, and, as is common in the art, I show these shafts worm-geared to a drive-shaft D, this construction and arrangement of parts serving to impart rotation to said drum, this rotation being either intermittent or constant, as the different steps in conversion of grain to malt may require, and of such speed as is found best suited to the work.

In common with the drums of other pneumatic malting apparatus, the one herein shown is provided with grain inlets $b$ closed by means of suitable covers, a malt discharge opening having a sliding cover that works in guides $c$, and a man-hole also provided with a sliding cover E, these covers being held closed by any suitable means. Each of the drum-heads has an outwardly flanged central opening, and the flanges constitute trunnions $d$ that turn freely in chambers F, G, having closed outer ends. The chamber F has a damper-controlled tubular connection H with a duct or passage I in communication with a suction-fan, not shown, but common in the art to which my invention relates. The chamber G has a damper controlled tube J connected to a box K that contains a steam-coil L, and a damper controlled pipe M from the flue N of a furnace O (hereinafter more particularly specified) connects with the tube J intermediate of said chamber and box. Another damper-controlled tube P connects the chamber G with a duct Q, and, as one of the features of the present invention, I show this duct as having a slightly inclined horizontal portion arranged any desirable distance below the frost-line and in communication with a well R, the water-level of the latter being below said duct. The well may have a natural supply of water, but where this is not possible, water is run into the well from any convenient source. At its mouth, I provide the well with a grating S of any suitable construction for the support of coke, or other suitable straining material, and positioned in the above described horizontal lower portion of the duct Q I arrange transverse gratings T, U, that incline in opposite directions and support a similar straining material.

Run down in the well R to a certain distance below the water-level of the same is a pipe V in communication with a pump (not shown) and connected to this pump or some other source of water supply, as may be most convenient, is a valve-controlled pipe W run into the duct Q and provided with perforated lateral branches e arranged over the strainers in said duct, the latter pipe and its branches constituting a sprinkler system fully illustrated in Figs. 1 and 6. A pipe X from a source of steam-supply is also run into the well R, and a similar pipe Y leads into the duct Q, this latter steam-pipe, another pipe Z from a source of compressed-air, and a valve-controlled branch f from the water-pipe W being connected to an atomizer located in said duct in line with the tube P leading to the chamber G above specified.

In the arrangement of parts herein shown, it is intended that, the valve g of water-pipe branch f shall be operated from above the surface by any suitable means, and it is also to be understood that the water-conductor for the atomizer may be independent of the pipe W, the showing herein made being simply a matter of convenient illustration.

The preferred form of atomizer is best illustrated in Figs. 7, 8 and 9, and comprises a hollow stem h that receives a nozzle i fitted to the air-pipe Z, (a ⊣-coupling joining this pipe and stem with the steam-pipe Y) a block j fitted to said stem and provided with lateral ports k, having spiral continuations k' leading up through the block, another nozzle n fitted in said block to communicate with the aforesaid stem, and still another nozzle p fitted in the aforesaid block to surround the one pertaining to the stem.

Referring again to the drum A, I show the same having one head thereof provided with a grated drain-outlet q surrounded by an exterior box r having a draw-off cock s, and within said drum adjacent to its other head is a transverse partition A' perforated adjacent to its periphery, as well as at intervals adjacent to its center. The partition is centrally provided with a support t for a beveled and perforated end of a perforated shell A² having the same diameter at all points away from said beveled end. The other end of the perforated shell has a flange bolted to the drum-head farthest from the perforated partition above specified.

From the foregoing it will be seen that the perforated shell A² turns with the drum and is open to the chamber G that connects with the furnace O and duct Q, as clearly illustrated in Fig. 2.

Particular attention is called to the fact that the intervals between perforations in the shell A² gradually diminish as said shell recedes from the suction end of the drum. By this construction I provide for an equal distribution of air throughout the length of the shell because of a gradual decrease in the number of said perforations and corresponding increase of resistance toward the point at which the suction is greatest. Supported within the shell A², central of the latter, is a pipe B' having lines of perforations in its upper portion and, as shown in Fig. 4, this pipe connects with other pipes C' D' that respectively communicate with sources of water and steam supply, these latter pipes being controlled by suitable valves. Upon its interior the drum is provided with longitudinal ribs u in the form of angle-irons bolted thereto, and the exterior of the shell A² is provided with similar ribs v, the purpose of the same being hereinafter specified.

The furnace O incidentally referred to in the foregoing and best illustrated in Figs. 1 and 10, consists of a fire-box E' and ash-pit F' having suitable doors and inclosed within a preferably arch-like compartment G' provided with a flue H' extended up into the main flue N that leads from another preferably arch-like compartment J' and fulcrumed to the latter flue is a lever K' from which hangs a cover L' for the former flue. At the base of the furnace, passages w connect the inner and outer compartments, and upper and lower inlets to said outer compartment are controlled by doors x y at the front and rear of said furnace. Above the passages w and lower air-inlets the outer compartment of the furnace is provided with suitable gratings—each being preferably a series of parallel I-beams—that support a mass of heat absorbing material z such as fire-brick.

In carrying out my system of malting, a suitable quantity of grain is run into the drum and all the various dampers being closed water is let on to the sprinkler-pipe B', this water being tempered by steam let on to the same pipe. The grain-inlets being closed, and the drum supplied with a sufficient quantity of water, a rotation is imparted to said drum to agitate the grain and cause a thorough washing of the same, after which the dirty water is drawn off through the drain-outlet in the aforesaid drum. Tempered water is again supplied to the drum and the latter rotated a sufficient time to properly steep the grain. In this connection it is to be understood that at all times in the operation of the drum, the solid material therein is lifted and turned over by the internal longitudinal ribs on the same, and at a certain point this material falls of its own gravity in an oblique direction transverse of said drum, as indicated by dotted line in Fig. 4. At the same time the external longitudinal ribs on the perforated shell in the drum retard the material and the latter falls away from said shell at a tangent, as is also shown by a dotted line in Fig. 4. Hence it will be seen that I provide for the best possible agitation of said material and prevent its adherence on the aforesaid shell where it falls across the same. The grain having been sufficiently steeped, cool moist air is admitted from the duct Q to the perforated shell A², from whence it is drawn away through the grain and the perforated partition A' in the rotating drum A, the damper in the tubes H, P, being regulated to control the draft. This latter treatment germinates the grain and by the peculiar construction of the shell A² I insure an equal germination of the mass of said grain. The greatest amount of air escapes from the drum through the perforations adjacent to the periphery of the partition A', but in order that none of the grain may escape the germinating influence I have provided said partition with perforations adjacent to its center and the beveled end of said shell. The atmospheric air is primarily relieved of dust and impurities by its passage through the straining material on the grating S at the mouth of the well R, and if this air be too cold it is properly tempered by the admission of steam into said well, this steam also imparting a certain amount of moisture to said air. The air is further strained by its passage through the inclined straining beds in the horizontal portion of the duct Q and moistened by the sprinkler-system also arranged in said portion of the duct, the surplus water running to the well. By conveying the atmospheric air through a duct below frost line it is not subjected to varying changes of temperature as would be otherwise the case, and this is of essential value in the germinating process of the grain. Compressed air, steam and water having been admitted to the atomizer, these elements are thoroughly mixed and escape from said atomizer in the form of a dense vapor that mingles with the atmospheric air, whereby the latter is completely saturated before coming into contact with the grain. In the operation of the atomizer the compressed-air has a direct passage and is mingled with the steam in the stem portion of said atomizer, while the water is given a whirling motion incidental to the spiral extension of the entrance ports and mixes with the intermingled air and steam in the outer nozzle of the aforesaid atomizer, the result being the dense vapor above specified. The water for the atomizer may be supplied from the well or from any other convenient source as hereinbefore set forth. The germination having been accomplished, the cool, moist air is cut off and warm atmospheric air from the box K admitted to the drum for the purpose of withering the malt after which this latter is cut-off and hot dry air from the furnace let on to dry said malt.

By means of the box K and inclosed steam-coil, I am enabled to warm and easily regulate the temperature of a large volume of air for the purpose of gradual evaporation of moisture from the germinated grain, thus withering the rootlets and drying the malt without baking the latter. The consumption of the rootlets and final drying of the malt are effected by furnace heat, and the result is a soft, mellow malt, whereas if only furnace heat be utilized, as is commonly the case, the malt is liable to be hard and glassy because of the difficulty in regulating the temperature especially at the commencement of the drying operation.

In order to determine the temperature of the various airs admitted to the drum during my system of malting, I provide the chambers F, G, with thermometers as shown in Fig. 1. The air primarily admitted to the furnace through the ash-pit is heated and passes out of the inner compartment into the outer one to escape through the main flue N and pipe M to the drum, the flue H' being closed at its upper end. A certain amount of the heat is absorbed by the material in the outer compartment of the furnace, and if air be admitted through the lower inlet of said furnace this air will be warmed by its contact with said heated material. If at any time it is desirable to check the heat, the upper air-inlets of the furnace are opened, and if the greatest possible heat is needed the cover of flue H' is lifted to permit a direct draft from the fire-box. By means of the flue N, a single furnace may connect with a series of malting drums.

Having now described my invention, what I claim as new, and desire to secure by Letters Patent, is—

1. The combination of a rotative horizontal non-perforate drum having a head thereof provided with a normally closed drain outlet, a perforated shell within the drum longitudinal of the same, and a fluid distributer within the shell, substantially as set forth.

2. The combination of a rotative horizontal non-perforate drum having one head thereof provided with a grated drain outlet surrounded by an exterior box having a draw-off cock, a perforated shell within the drum longitudinal of the same, and a fluid distributer within the shell, substantially as set forth.

3. The combination of a rotative horizontal drum, a shell inclosed therein central of the same and provided with perforations at variable intervals of its length, an air-duct communicating with one end of the shell, an air-exhaust in connection with the drum at that end farthest from the air-inlet to the shell, and a transverse partition in said drum intermediate of the exhaust and shell, this partition being of such construction as to permit a suction of air through said shell, substantially as set forth.

4. The combination of a rotative horizontal drum, a longitudinal shell inclosed therein, and provided with perforations at variable intervals of its length, an air-duct communicating with that end of the shell having the greatest number of perforations, an air-exhaust in connection with the drum at that end farthest from the air-inlet to the shell, and a transverse partition in said drum intermediate of the exhaust and shell, this partition being of such construction as to permit a suction of air through said shell, substantially as set forth.

5. The combination of a rotative horizontal drum, a longitudinal shell inclosed therein, this shell provided with a perforated beveled end but having approximately the same diameter at all points in a direction away from this beveled end and perforated at gradually diminishing intervals in the same direction, an air-duct communicating with the non-beveled end of the shell, an air-exhaust in connection with the drum at that end farthest from the air-inlet to the shell, and a transverse partition in said drum intermediate of the exhaust and shell, this partition being provided with perforations adjacent to its periphery as well as adjacent to its center, substantially as set forth.

6. The combination of a rotative horizontal drum, a shell therein having perforations gradually decreasing in number longitudinally thereof, an air-duct communicating with the most perforate end of the shell and having a portion of itself below frost-line open to atmosphere, an air-exhaust communicating with the drum at that end farthest from the air-inlet to the shell, and an air-space within said drum intermediate of the exhaust and least perforate end of said shell but communicating with that portion of the aforesaid drum containing the aforesaid shell, substantially as set forth.

7. The combination of a rotative horizontal drum, a shell therein having perforations gradually decreasing in number longitudinally thereof, an air duct communicating with the most perforate end of the shell and having a portion of itself below frost-line open to atmosphere, an air-exhaust communicating with the drum at that end farthest from the air inlet to the shell, air straining material in the duct, an air-exhaust communicating with the drum at that end farthest from the air-inlet to the shell, and an air-space within said drum intermediate of the exhaust and least perforate end of said shell but communicating with that portion of the aforesaid drum containing the aforesaid shell, substantially as set forth.

8. The combination of a rotative horizontal drum, a shell therein having perforations gradually decreasing in number longitudinally thereof, an air-duct communicating with the most perforate end of the shell and having a portion of itself below frost-line open to atmosphere, an air-exhaust communicating with the drum at that end farthest from the air inlet to the shell, an air-moistener in the duct, an air-exhaust communicating with the drum at that end farthest from the air-inlet to the shell, and an air-space within said drum intermediate of the exhaust and least perforate end of said shell but communicating with that portion of the aforesaid drum containing the aforesaid shell, substantially as set forth.

9. The combination of a rotative horizontal drum, a shell therein having perforations gradually decreasing in number longitudinally thereof, an air-duct communicating with the most perforate end of the shell and having a portion of itself below frost-line open to atmosphere, an air-warmer in that portion of the duct leading from its lower portion to the atmosphere, an air-exhaust communicating with the drum at that end farthest from the air-inlet to the shell, and an air-space within said drum intermediate of the exhaust and least perforate end of said shell but communicating with that portion of the aforesaid drum containing the aforesaid shell, substantially as set forth.

10. The combination of a rotative horizontal drum, a shell therein having perforations gradually decreasing in number longitudinally thereof, an air-duct communicating with the most perforate end of the shell and having a portion of itself below frost-line open to atmosphere, an air-warmer in that portion of the duct leading from its lower portion to atmosphere, air straining material and a moistener in said lower portion of the duct, an air-exhaust communicating with the drum at that end farthest from the air-inlet to the shell, and an air-space within said drum intermediate of the exhaust and least perforate end of said shell but communicating with that portion of the aforesaid drum containing the aforesaid shell, substantially as set forth.

11. The combination of a rotative horizontal drum, a longitudinally perforated shell therein an air-duct having a vertically disposed portion communicating with one end of the shell and a horizontally disposed portion below frost-line, a well in communication with the lower portion of the duct, an air-strainer in the well, an air-exhaust in communication with that end of drum farthest from the air-inlet to the shell, and a transverse partition in said drum intermediate of the exhaust and shell, this partition being of such construction as to permit a suction of air through said shell, substantially as set forth.

12. The combination of a rotative horizontal drum, a perforated longitudinal shell inclosed therein, an air-duct communicating with one end of the shell and having a portion thereof below frost-line, a well in communication with the lower portion of the air-duct, a steam pipe leading into the well, an air-exhaust in connection with that end of the drum farthest from the air-inlet to the shell, and a transverse partition in said drum intermediate of the exhaust and shell this partition being of such construction as to permit a suction of air through said shell, substantially as set forth.

13. The combination of a rotative horizontal drum, a longitudinal perforated shell inclosed therein, an air-duct communicating with one end of the shell and having a portion thereof below frost-line, a well in communication with the lower portion of the air-duct, an atomizer in this duct, suitable means for delivering water from the well to the atomizer, an air-exhaust in connection with that end of the drum farthest from the air-inlet to the shell and a transverse partition in said drum intermediate of the exhaust and shell, this partition being of such construction as to permit a suction of air through said shell, substantially as set forth.

In testimony that I claim the foregoing I have hereunto set my hand, at Milwaukee, in the county of Milwaukee and State of Wisconsin, in the presence of two witnesses.

FRANKLIN B. GIESLER.

Witnesses:
   N. E. OLIPHANT,
   GEO. W. YOUNG.